United States Patent
Leahy et al.

(10) Patent No.: US 7,434,778 B2
(45) Date of Patent: Oct. 14, 2008

(54) BREAKAWAY SIGNPOST CONNECTOR

(75) Inventors: Matthew Edward Leahy, Auburn, IL (US); Lawrence Edward Leahy, Auburn, IL (US)

(73) Assignee: Xcessories Squared, Auburn, IL (US)

( * ) Notice: Subject to any disclaimer, the term of this patent is extended or adjusted under 35 U.S.C. 154(b) by 438 days.

(21) Appl. No.: 11/060,335

(22) Filed: Feb. 17, 2005

(65) Prior Publication Data
US 2005/0166482 A1    Aug. 4, 2005

Related U.S. Application Data

(63) Continuation-in-part of application No. 10/004,057, filed on Nov. 2, 2001, now Pat. No. 6,959,902.

(51) Int. Cl.
*F16M 13/00* (2006.01)
(52) U.S. Cl. ............... 248/548; 248/530; 403/2; 52/98; 52/296
(58) Field of Classification Search ........... 52/98, 52/296; 248/511, 548, 530, 519, 156, 909, 248/638; 411/3–5, 389, 246, 546; 403/3, 403/327, 300, 363
See application file for complete search history.

(56) References Cited

U.S. PATENT DOCUMENTS

| | | | | |
|---|---|---|---|---|
| 3,512,447 A | * | 5/1970 | Vaughn | ........................... 411/5 |
| 3,521,413 A | * | 7/1970 | Scott et al. | ..................... 52/98 |
| 3,951,556 A | * | 4/1976 | Strizki | ............................ 403/2 |
| 3,967,906 A | * | 7/1976 | Strizki | ............................ 403/2 |
| 4,071,970 A | | 2/1978 | Strizki | |
| 4,234,153 A | * | 11/1980 | Chihara et al. | ........... 248/475.1 |
| 4,528,786 A | * | 7/1985 | Dinitz et al. | .................. 52/98 |
| 4,592,687 A | * | 6/1986 | Piersall | .......................... 411/4 |
| 4,720,204 A | | 1/1988 | Johnson | |
| 4,791,243 A | * | 12/1988 | Ibanez et al. | .............. 174/45 R |
| 4,926,592 A | | 5/1990 | Nehls | |
| 5,125,194 A | | 6/1992 | Granger | |
| 5,214,886 A | | 6/1993 | Hugron | |
| 5,474,408 A | * | 12/1995 | Dinitz et al. | .................... 411/5 |
| 5,480,121 A | | 1/1996 | Rice et al. | |
| 5,782,040 A | | 7/1998 | McCartan | |
| 5,860,253 A | | 1/1999 | Lapointe | |
| 5,957,425 A | | 9/1999 | Conway et al. | |
| 6,056,471 A | * | 5/2000 | Dinitz | ............................ 403/2 |
| 6,308,927 B1 | * | 10/2001 | Leahy | ......................... 248/548 |
| 6,341,917 B1 | * | 1/2002 | Schubring et al. | .......... 403/296 |
| 6,560,906 B1 | | 5/2003 | Hillstrom | |
| 6,959,902 B2 | * | 11/2005 | Leahy | ......................... 248/548 |

* cited by examiner

*Primary Examiner*—Richard E. Chilcot, Jr.
*Assistant Examiner*—Chi Q Nguyen
(74) *Attorney, Agent, or Firm*—Armstrong Teasdale, LLP

(57) ABSTRACT

A breakaway signpost connector enables a sign support member to be fastened to an anchor member. The connector includes at least one shear member and a coupler assembly. The shear member has a first end, a second end, and a necked down section between the first and second ends. The coupler assembly surrounds the shear member and includes a first opening and a second opening. The shear member first end extends through the first opening, and the shear member second end extends through the second opening.

30 Claims, 4 Drawing Sheets

BREAKAWAY SIGNPOST CONNECTOR

CROSS REFERENCE TO RELATED APPLICATIONS

This application is a continuation-in-part application of U.S. application Ser. No. 10/004,057 filed Nov. 2, 2001 and issued as U.S. Pat. No. 6,595,902.

BACKGROUND OF THE INVENTION

This invention relates generally to signposts and, more particularly, to breakaway signposts for signs adjacent to roadways.

A roadway sign typically includes an anchor that is driven into the ground, an extended support connected to the anchor and extending above the ground, and a sign attached to the support. Due to their proximity to the roadway, road signs may be a hazard for errant vehicles.

The Federal Highways Administration ("FHWA") has promulgated yielding criteria for signposts and structures located adjacent to designated traffic areas both to protect the occupants of vehicles and to reduce property damage from collisions with these structures. For small and intermediate roadside supports, the FHWA standards required a structure weak enough to bend upon impact and allow a vehicle to pass over the support structure with minimum deceleration. Thus, occupant interior impact could be avoided and vehicular damage could be minimized. After a collision, however, the entire roadway sign support needs to be replaced, including the anchor in many cases.

To avoid the cost of replacing the anchors after a collision, signposts have been designed in which the sign support shears from the anchor upon impact so that the anchor may subsequently be reused with a replacement support after a collision. Couplers machined or cast with predetermined break points, such as shear bolts, have been employed with some success to separate the sign support and the anchor so that the anchor is undamaged when a vehicle collides with a signpost. However, the couplers are vulnerable to shearing from wind loads on a sign.

BRIEF DESCRIPTION OF THE INVENTION

In one aspect, a breakaway signpost connector for attaching a sign support member to an anchor member is provided. The connector includes at least one shear member and a coupler assembly. The shear member has a first end, a second end, and a necked down section between the first and second ends. The coupler assembly surrounds the shear member and includes a first opening and a second opening. The shear member first end extends through the first opening, and the shear member second end extends through the second opening.

In another aspect, a breakaway signpost assembly configured to extend from the ground is provided. The breakaway signpost assembly includes an anchor member, a shear bolt, and a coupler assembly. The anchor member is configured to be inserted at least partially into the ground and includes a recess defined therein. The shear bolt has a first end, a second end, and a necked down section between the first and second ends. One of the first and second ends includes a shoulder. The coupler assembly surrounds the shear member and includes a first opening and a second opening. The shear member first end extends through the first opening, and the shear member second end extends through the second opening.

In a further aspect, a method for assembling a breakaway signpost is provided. The method comprises positioning an anchor member with respect to grade, inserting a first end of a shear member through a coupler assembly, wherein the shear member includes the first end, a second end, and a necked down section between the first and second ends, and extending the shear member second end through the coupler assembly. In addition, the method comprises coupling the coupler assembly to the anchor member, and coupling a sign support member to the coupler assembly.

DETAILED DESCRIPTION OF THE INVENTION

Figure 1:
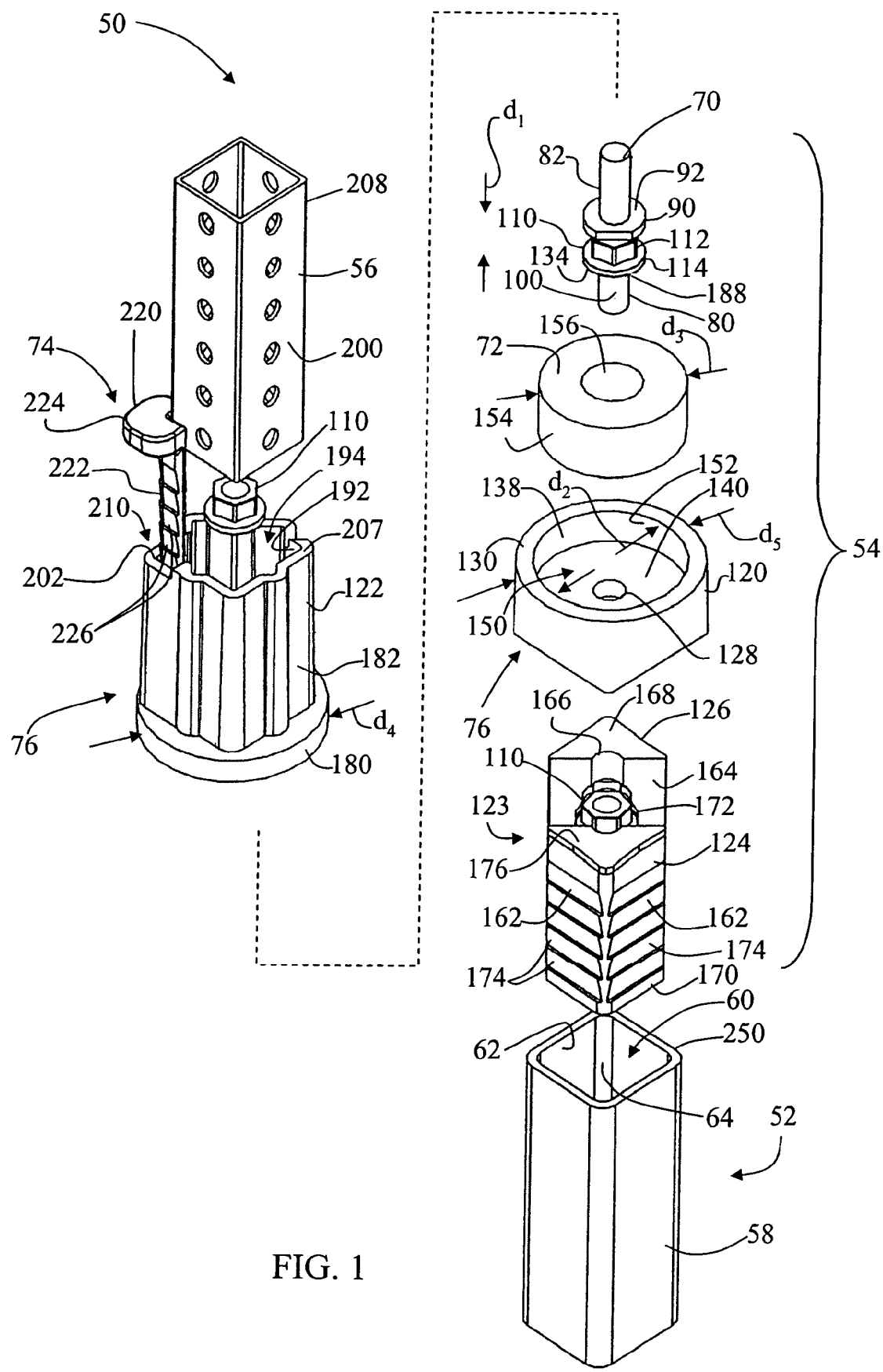
FIG. 1 is an exploded view of an exemplary embodiment of a breakaway signpost assembly.
Figure 2:
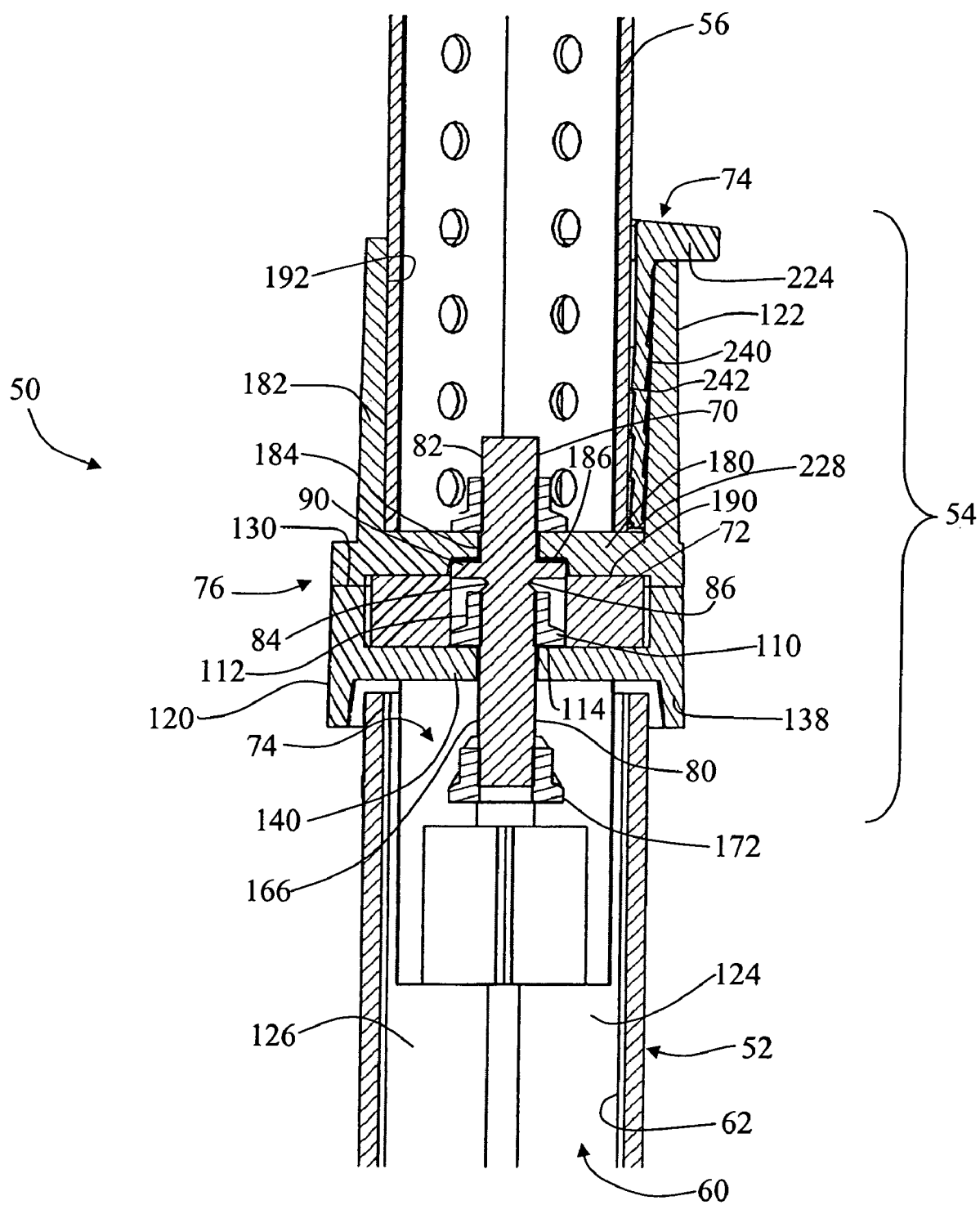
FIG. 2 is a cross-sectional view of breakaway signpost assembly shown in FIG. 1 and fully assembled.

FIG. 1 is an exploded view of one embodiment of a breakaway signpost assembly 50 including a ground anchor member 52, a breakaway connector 54, and a sign support member 56. FIG. 2 is a cross-sectional view of an assembled breakaway signpost assembly 50. In the exemplary embodiment, anchor member 52 includes an elongated ground anchor connector 58, that has a generally square cross-section. Alternatively, connector 58 may have a variety of other shapes including, but not limited to, L-shaped, J-shaped, circular, U-channel, or flanged beam cross sections. Moreover, anchor member 52 is hollow and includes a recess 60 defined therein by an inner surface 62 of member 52. In the exemplary embodiment, recess 60 has a generally square cross-sectional shape and includes filleted corners 64. Alternatively, recess 60 is defined by a variety of other shapes, including, but not limited to, rectangular, circular, or triangular shapes.

In the exemplary embodiment, breakaway connector 54 includes a shear member 70, a bushing 72, a locking wedge assembly 74 including at least one locking wedge 220, and a coupler assembly 76. Shear member 70 includes a first threaded end 80, an opposite second threaded end 82, and a necked-down section 84 that is at an approximate center of shear member 70 between first and second ends 80 and 82, respectively. In the exemplary embodiment, first and second ends 80 and 82, respectively, are identical and each has a substantially circular cross-sectional profile. Necked-down section 84 has a gradually decreasing diameter relative to first and second ends 80 and 82, respectively, and as such, forms a generally V-shaped profile with an apex 86. More specifically, necked-down section 84 has a minimum diameter at apex 86 that corresponds to a predetermined fracture load, and a maximum diameter approximately equal to the diameter of first and second ends 80 and 82, respectively.

Shear member second end 82 includes a stop shoulder 90 adjacent necked-down section 84. In the exemplary embodiment, shoulder 90 is substantially circular and has an outer radius and an upper surface 92. Upper surface 92 is substantially planar.

Shear member 70 also includes a pair of flat sides 100. Flat sides 100 extend above and below necked-down section 84 along first end 80 to allow shear member 70 to be manipulated with standard tools, such as a wrench, during assembly of breakaway signpost assembly 50. Flat sides 100 do not affect the breaking of shear member 70 by impact, such as by vehicular impact, since they are positioned to be substantially parallel to a line of impact from a collision. Alternatively, shear member 70 does not include flat sides 100.

A first flanged, serrated nut 110 is threadably coupled to shear member first end 80. More specifically, nut 110 is threadably coupled to shear member 80 such that a head portion 112 of nut 110 is positioned adjacent necked-down section 84, and is thus between necked-down section 84 and a flanged portion 114 of nut 110. Accordingly, and as discussed in more detail below, flanged portion 114 forms a second stop shoulder for shear member 70 that is spaced a radial distance $d_1$ from shoulder 90.

Coupler assembly 76 includes a lower coupler 120, an upper coupler 122, and lower wedge assembly 123 that includes a pair of opposed anchor locking wedges 124 and 126. Lower coupler 120 includes a sidewall 138 and is formed integrally with a base plate 140. Alternatively, base plate 140 may be coupled to lower coupler 120 in a variety of other means, including, but not limited to welding, gluing, or bolting. Base plate 140 is spaced from an end face 130 of sidewall 138, such that base plate 140 and the portion of sidewall 138 extending between base plate 140 and end face 130 define the boundaries of a recess 150 defined within lower coupler 120. Recess 150 has a shape that is defined by an inner surface 152 of sidewall 138 that is substantially similar to the shape of bushing 72, as defined by an outer surface 154 of bushing 72. In the exemplary embodiment, recess 150 is substantially circular and has a diameter $d_2$ that is slightly larger than an outer diameter $d_3$ of bushing 72. Alternatively, recess 150 is defined by a variety of other shapes, including, but not limited to, rectangular, square, or triangular shapes.

Base plate 140 extends substantially perpendicularly to coupler sidewall 138 and is substantially circular. An opening 128 extends substantially concentrically through base plate 140. In the exemplary embodiment, opening 128 is not threaded. In an alternative embodiment, opening 128 is threaded. Opening 120 has a diameter that is slightly larger than the diameter of shear member end 80 and is smaller than the diameter of stop shoulder 90. Moreover, the diameter of opening 120 is also smaller than the diameter of serrated nut 110 as defined by an outer surface 134 of flanged portion 114. Accordingly, opening 120 is sized to receive at least a portion of shear member 70 therethrough.

Lower coupler end face 130 is serrated to facilitate coupling between lower and upper couplers 120 and 122, respectively. In the exemplary embodiment, each serration extends approximately 0.125 inches into end face 130, and adjacent serrations are approximately 6° apart.

Bushing 72 is inserted over, and substantially surrounds, shear member 70. In the exemplary embodiment, bushing 72 is fabricated from a high-density rubber, or another highly-resilient material, and is shaped to fit at least partially within lower coupler recess 150. In one embodiment, bushing 72 has a durometer rating of approximately 90. In the exemplary embodiment, bushing 72 is substantially circular and includes a center opening 154 extending therethrough. Alternatively, depending on the shape of recess 150, a variety of other bushing shapes may be used, including, but not limited to, rectangular, square, or triangular shapes. In the exemplary embodiment, bushing opening 154 a diameter that is substantially equal to an outer diameter of shear member shoulder 90. In an alternative embodiment, breakaway signpost assembly 50 does not include bushing 72.

In the exemplary embodiment, locking wedge assembly 123 includes a pair of identical wedges 124 and 126. Alternatively, wedges 124 and 126 are different. In another alternative embodiment, locking wedge assembly 123 includes more or less than two locking wedges 124 and 126. Each wedge 124 and 126 has a substantially right triangular shape that is defined by a pair of sidewalls 162 that are substantially perpendicular to each other, and an inner face 164 that extends obliquely between the pair of sidewalls 162.

Inner face 164 is substantially planar and includes a channel 166 defined therein that extends from an upper end 168 of each wedge 124 and 126 towards a lower end 170 of each wedge 124 and 126. More specifically, in the exemplary embodiment, each channel 166 extends from upper end 168 to a nut recessed area 172 formed integrally within each inner face 164. In the exemplary embodiment, each channel 166 is semi-circular and has a diameter that is approximately equal to the diameter of shear member first end 80. Nut recessed area 172 has a cross-sectional shape that substantially mirrors the external shape of a second flanged serrated nut 110. Accordingly, when wedges 124 and 126 are positioned such that inner faces 164 are adjacent each other, wedge assembly 123 has a cross-sectional shape that is substantially similar to that of anchor member recess 60, channels 166 form a tapered recess that is sized to receive at least a portion of shear member first end 80 therein, and recessed area 172 is sized to receive a second flanged serrated nut 110 therein.

Each wedge sidewall 162 is formed from a plurality of wedge shaped projections 174 that extend from a lip 176 formed at upper end 168 to lower end 170. In one embodiment, lip 176 is formed integrally with each sidewall 162. Accordingly, each sidewall 162 tapers gradually from lip 176 to lower end 170. Lip 176 facilitates positioning each wedge 124 and 126 with respect to anchor member 52 and thus limits an insertion depth of wedge assembly 123 within recess 60.

Coupler assembly upper coupler 122 includes a base 180 and an integrally formed sidewall 182 that extends substantially perpendicularly from base 180. In the exemplary embodiment, base 180 is substantially circular and has an outer diameter $d_4$ that is approximately equal to an outer diameter $d_5$ of lower coupler end face 130 as defined by lower coupler sidewall 138. Alternatively, base 180 is defined by a variety of other shapes, including, but not limited to, rectangular, square, or triangular shapes. In the exemplary embodiment, base 180 is formed integrally with sidewall 182. Alternatively, base 180 may be coupled to sidewall 182 in a variety of other means, including, but not limited to, welding, gluing, or bolting.

Base 180 extends substantially perpendicularly to coupler sidewall 182 and includes an opening 184 that extends substantially concentrically therethrough. In one embodiment, opening 184 is threaded. Opening 184 has a diameter that is slightly larger than the diameter of shear member second end 82 and is smaller than the diameter of stop shoulder 90. More specifically, in the exemplary embodiment, base 180 also includes a recessed portion 186 that extends circumferentially around opening 184 and is sized to receive stop shoulder 90 therein. Recessed portion 186 is defined within a lower surface 190 of base 180 such that when shear member 70 is received within opening 184, a lower surface 188 of shoulder 90 is substantially co-planar with base lower surface 190.

In the exemplary embodiment, base lower surface 190 is serrated to facilitate coupling between lower and upper couplers 120 and 122, respectively. More specifically, the combination of the serrations within lower surface 190 and end face 130 facilitates lower and upper couplers 120 and 122 locking together. Accordingly, the serrations facilitate couplers 120 and 122 securely coupling together even if anchor member 52 is not exactly perpendicularly aligned with respect to the ground to which breakaway signpost assembly 50 is mounted. In the exemplary embodiment, each serration extends approximately 0.125 inches into end face 190, and adjacent serrations are approximately 6° apart.

An inner surface 192 of coupler sidewall 182 defines a recess 194 within upper coupler 122. Recess 194 has a cross-sectional shape that is generally the same as a cross-sectional shape of sign support 52 to be inserted therein, as defined by an external surface 200 of support 52. More specifically, recess 194 is also defined by a wedge recessed area 202 that, as described in more detail below, facilitates securing sign support 52 within recess 194 without the use of mechanical fastening means. More specifically, recessed area 202 is also at least partially recessed with respect to an upper end face 207 of sidewall 182. In an alternative embodiment, recess 194 is defined by a plurality of wedge recessed areas 202. In the exemplary embodiment, recessed area 202 tapers gradually from an upper end 210 of coupler 122 towards base 180. For example, in the exemplary embodiment, recessed area 202 tapers inwardly approximately 5° from end 210 towards base 180. In the exemplary embodiment, recess 194 is generally square-shaped and wedge recessed area 202 is configured to contact a corner 208 of sign support 52 when support 52 is coupled within upper coupler 122.

Recessed area 202 is sized to receive a locking wedge 220 therein. Locking wedge 220 is formed with a pair of sidewalls 222 that are that are substantially perpendicular to each other, and that each extend from an anchoring head 224. More specifically, each sidewall 222 is formed from a plurality of wedge shaped projections 226 that extend from anchoring head 224 to a lower end 228 of each wedge 220. More specifically, in the exemplary embodiment, wedge shaped projections 226 extend along the outer and inner surfaces 240 and 242, respectively, of each locking wedge 220. Moreover, in the exemplary embodiment, each sidewall 222 tapers gradually from head 224 to lower end 228.

During assembly of breakaway signpost assembly 50, initially anchor member 52 is inserted into the ground such that a top edge 250 of anchor member 52 is countersunk approximately one inch with respect to grade. A serrated nut 110 is positioned within a nut recessed area 172 defined within a first locking wedge inner face 164, and the second locking wedge 126 is positioned adjacent the first locking wedge 124 such that inner faces 164 are adjacent, and such that nut 110 is contained within opposing nut recessed areas 172.

Wedge assembly 123 is then inserted into anchor member recess 60. Locking wedge lips 172 limit the insertion depth of wedge assembly 123 within recess 60 and facilitate positioning wedges 124 and 126 with respect to anchor member 52 such that nut 110 is substantially concentrically aligned with respect to anchor member 52. Lower coupler 120 is then positioned against wedge assembly 74 such that coupler opening 128 is aligned substantially concentrically with respect to wedge assembly 123 and to nut 110. More specifically, because anchor member 52 is countersunk with respect to grade, when lower coupler 120 is positioned against wedge assembly 123, in the exemplary embodiment, lower coupler end face 130 will be substantially flush with the grade.

A second nut 110 is then threadably coupled to shear member first end 80 such that the nut 110 is positioned adjacent shear member necked-down section 84. This particular nut 110 provides a means for removing a broken half of shear member 70 in the event that shear member 70 is sheared following an impact, such as a vehicular impact.

Shear member 70 is then inserted through lower coupler opening 128 and into wedge assembly 123, and more specifically, into the tapered passageway defined between adjacent channels 166. Shear member 70 is then rotated to cause the nut 110 encased within nut recessed areas 172 to threadably couple to shear member first end 80. More specifically, because the passageway defined by channels 166 is tapered, continued rotation of shear member 70 causes the nut 110 housed within nut recessed areas 172 to be drawn towards necked-down section 84, thus forcing locking wedges 124 and 126 outward against anchor member inner surface 62. Locking wedge projections 170 facilitate retaining locking wedge assembly 74 within anchor member recess 60.

Bushing 72 is then inserted over shear member 70 such that shear member 70 extends at least partially through bushing opening 154. More specifically, when fully coupled around shear member 70, bushing 72 is seated within lower coupler recess 150.

Upper coupler 122 is then positioned against lower coupler 120 such that shear member second end 82 extends through upper coupler opening 184. A serrated nut 110 is then rotatably coupled to shear member second end 82 and is tightened until the serrated teeth of upper coupler 122 and lower coupler 120 are fully meshed together. More specifically, the cooperation of the serrated edges between upper and lower couplers 122 and 120, respectively, enables signpost assembly 50 to be indexed or oriented to an optimum sign position for the traffic pattern, regardless of the orientation of anchor member 52 with respect to the traffic pattern. Moreover, the meshing of the serrations of upper and lower couplers 122 and 120, respectively, facilitates preventing rotation of signpost assembly 50 during windy conditions.

Furthermore, when upper and lower couplers 122 and 120, respectively, are fully coupled together, bushing 72 is compressed in sealing contact between lower coupler base plate 140 and upper coupler base 180. The compression of bushing 72 facilitates preventing moisture away from shear member necked-down section 84. Moreover, the compression of bushing 72 also facilitates bushing 72 biasing upper coupler 122 away from lower coupler 120 during an impact. In addition, bushing 72 facilitates spreading the wind bearing load over a greater area than necked-down section 84 to provide greater resistance to wind shear than shear member 70 has alone while still allowing shear member 70 to shear in compliance with FWHA standards.

Sign support member 56 is then inserted into upper coupler recess 194 until bottomed out. Locking wedge 220 is then forcibly inserted into a recessed area 202. As locking wedge 220 is inserted between sign support member 56 and upper coupler 122, wedge shaped projections 226 facilitate securing support member 56 within recess 194 without the use of additional fasteners and/or hardware.

Multiple assemblies 50 could be used for large signs and signal structures.

Figure 3:
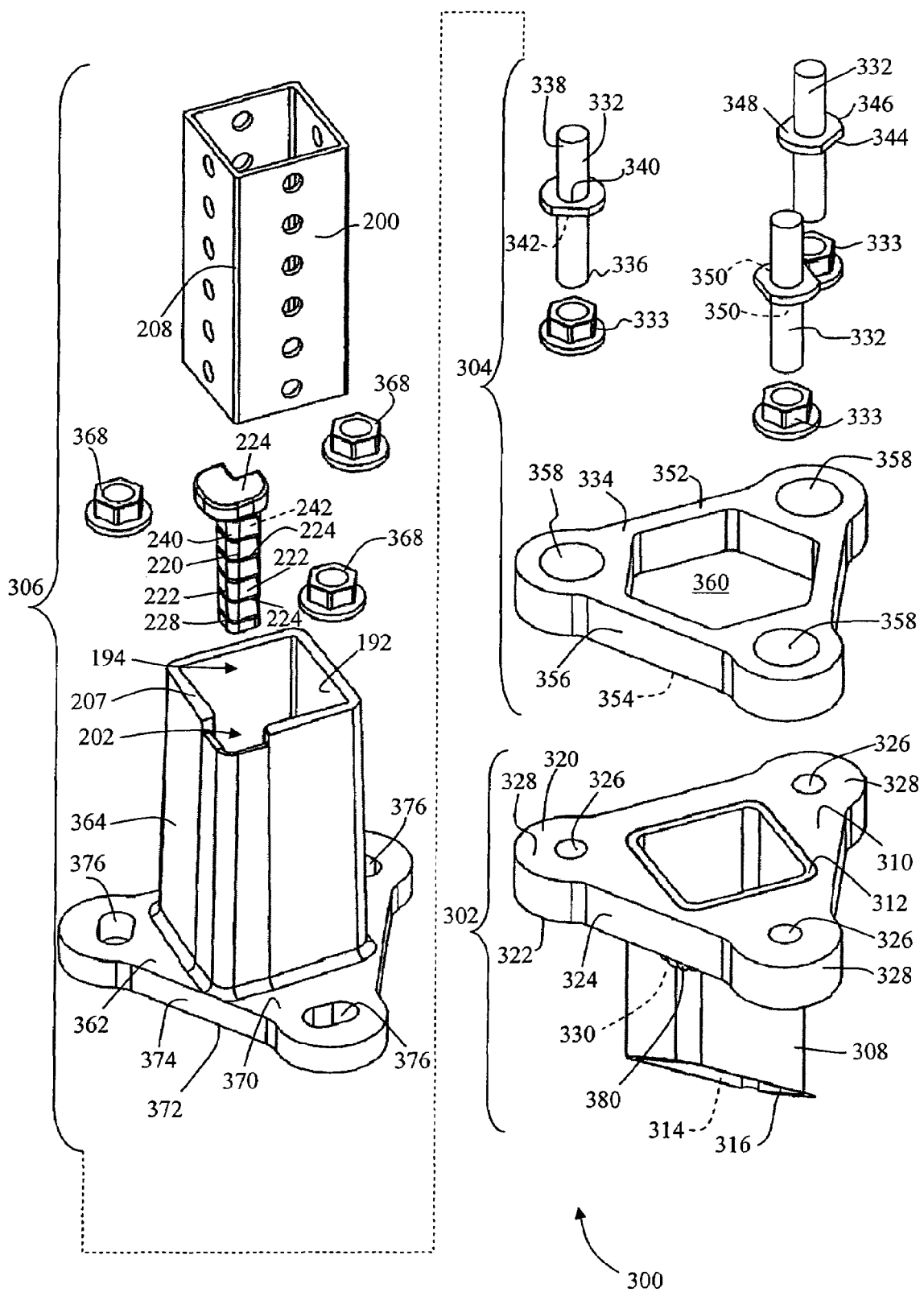
FIG. 3 is an exploded view of an alternative embodiment of a breakaway signpost assembly.
Figure 4:
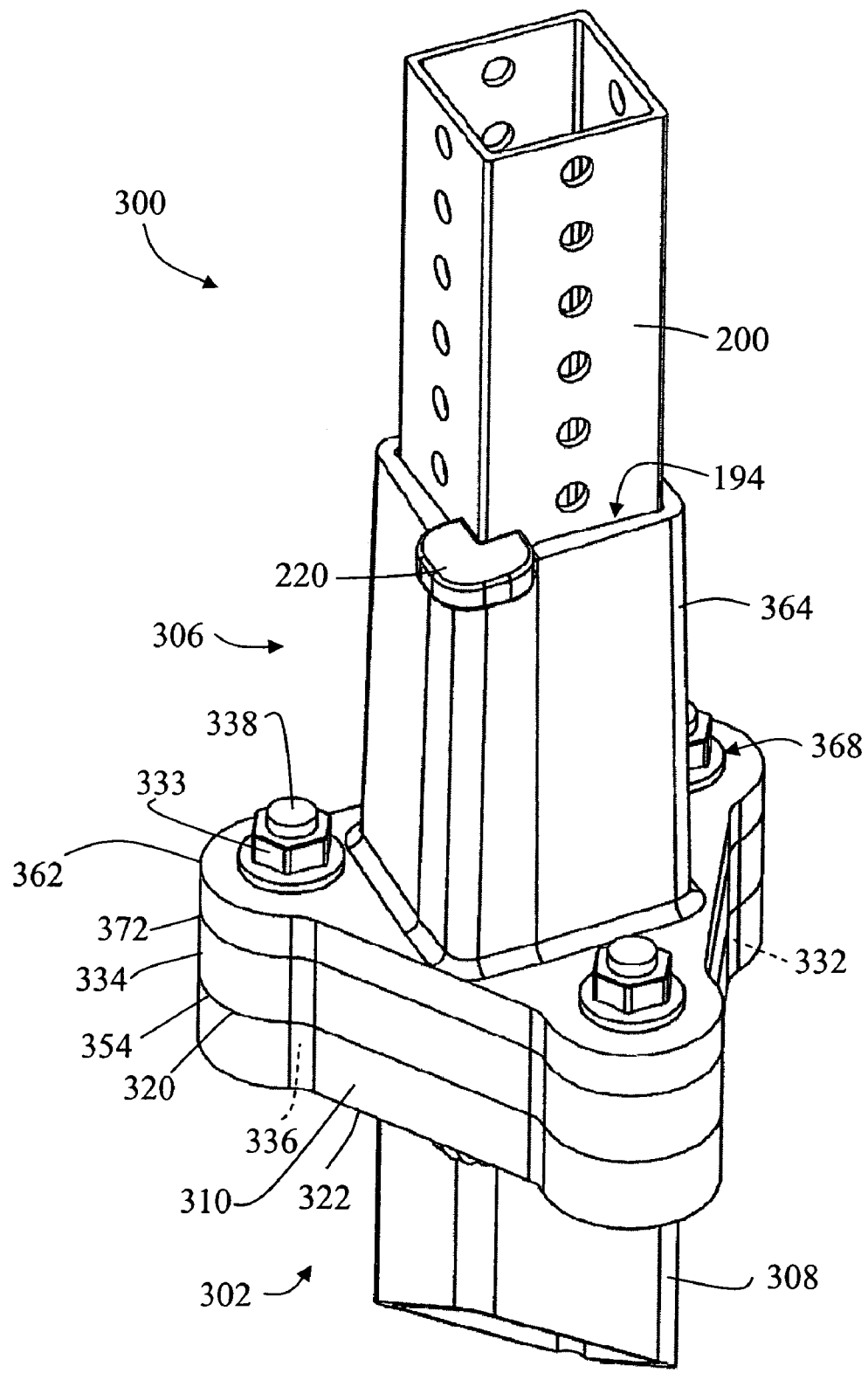
FIG. 4 is a perspective view of the breakaway signpost assembly shown in FIG. 3 and fully assembled.

FIG. 3 is an exploded view of an alternative embodiment of a breakaway signpost assembly 300. FIG. 4 is a perspective view of an assembled breakaway signpost assembly 300. Breakaway signpost assembly 300 includes similar components to the breakaway signpost assembly 50 described above. Like reference numerals are numbered the same as those described and shown with respect to FIGS. 1-2. Breakaway signpost assembly 300 includes an anchor member 302, a breakaway connector 304, and a support member 306.

In the exemplary embodiment, anchor member 302 includes an elongated ground anchor connector 308, and a bottom coupler 310 that is coupled to one end 312 of ground anchor connector 308. In one embodiment, anchor connector 308 has a generally square cross-section. Alternatively, connector 308 may have a variety of other shapes including, but not limited to, L-shaped, J-shaped, circular, U-channel, or flanged beam cross sections. Moreover, anchor member 302 is hollow and includes a recess 314 defined therein by an inner surface 316 of connector 308. In the exemplary embodiment, recess 314 has a generally square cross-sectional shape. Alternatively, recess 314 is defined by a variety of other shapes, including, but not limited to, rectangular, circular, or triangular shapes.

Bottom coupler 310 includes a first surface 320, a second surface 322, and a sidewall 324 extending therebetween. A plurality of bores 326 extend between first and second surfaces 320 and 322 and extend generally parallel to sidewall 322. First and second surfaces 320 and 322 are generally planar and extend substantially perpendicularly with respect to one another. Bores 326 are oriented on bottom coupler 310 to receive breakaway connector 304 therein and to secure support member 306 to anchor member 302. In the exemplary embodiment, bottom coupler 310 includes three bores 326 and is formed in a generally triangular shape having three pads 328 at the corners of the triangular shape such that the three bores 326 are positioned within bottom coupler 310 at each of the three pads 328. Alternatively, bottom coupler 310 can have more or less than three bores 326 and can have a variety of shapes, such as, but not limited to, a rectangular, hexagonal, or circular shape.

Bottom coupler 310 also includes a center cavity 330. Cavity 330 extends from second surface 322 and is oriented such that a portion of ground anchor connector 308 extends within cavity 330. In one embodiment, bottom coupler 310 is coupled to anchor connector 308 by a welding process. In another embodiment, bottom coupler 310 may be coupled to anchor connector 308 in a variety of other means, including, but not limited to gluing, or bolting. In an alternative embodiment, bottom coupler 310 and anchor connector 308 may be integrally formed.

In the exemplary embodiment, breakaway connector 304 includes a plurality of shear members 332, a plurality of nuts 333 and a bushing 334. Each shear member 332 includes a first threaded end 336, an opposite second threaded end 338, and a necked-down section 340 that is at an approximate center of shear member 332 between first and second ends 336 and 338, respectively. In the exemplary embodiment, first and second ends 336 and 338, respectively, are identical and each has a substantially circular cross-sectional profile. Necked-down section 340 has a gradually decreasing diameter relative to first and second ends 336 and 338, respectively, and as such, forms a generally V-shaped profile with an apex 342. More specifically, necked-down section 340 has a minimum diameter at apex 342 that corresponds to a predetermined fracture load, and a maximum diameter approximately equal to the diameter of first and second ends 336 and 338, respectively.

Shear member second end 338 includes a stop shoulder 344 adjacent necked-down section 340. In the exemplary embodiment, shoulder 344 is substantially circular and has an outer radius 346 and an upper surface 348. Upper surface 348 is substantially planar.

Each shear member 332 also includes a pair of flat sides 350. Flat sides 350 extend above and below necked-down section 340 to allow shear members 332 to be manipulated with standard tools, such as a wrench, during assembly of breakaway signpost assembly 300. Flat sides 350 do not affect the breaking of shear member 332 by impact, such as by vehicular impact, since they are positioned to be substantially parallel to a line of impact from a collision. Alternatively, shear members 332 do not include flat sides 350.

Bushing 334 includes a first surface 352, a second surface 354, and a sidewall 356 extending therebetween. A plurality of bores 358 extend through bushing 334 and are generally parallel to sidewall 356. First and second surfaces 352 and 354 are generally planar and extend substantially parallel with one another. In the exemplary embodiment, bushing 334 has a substantially similar shape as bottom coupler 310 and a similar number and placement of bores 358 as included in bottom coupler 310. In the exemplary embodiment, each bore 358 is oriented to receive a respective shear member 332 such that bushing 334 substantially surrounds stop shoulder 344. In one embodiment, bushing 334 is fabricated from a high-density rubber, or another highly-resilient material. In one embodiment, bushing 334 has a durometer rating of approximately ninety. In the exemplary embodiment, bushing 334 includes a central opening 360 extending between first surface 352 and second surface 354. Opening 360 facilitates reducing the overall weight of bushing 334 and providing flex in bushing 334 such that bushing 334 can be manipulated. In an alternative embodiment, breakaway signpost assembly 300 does not include bushing 334.

Support member 306 includes a top coupler 362, a base member 364, locking wedge 202, a plurality of nuts 368 and sign support 52. Top coupler 362 includes a first surface 370, a second surface 372, and a sidewall 374 extending therebetween. A plurality of bores 376 extend between first and second surfaces 370 and 372 and extend generally parallel to sidewall 374. First and second surfaces 370 and 372 are generally planar and extend substantially perpendicularly with respect to one another. In the exemplary embodiment, top coupler 362 has a substantially similar shape as bottom coupler 310 and a similar number and placement of bores 376 as included in bottom coupler 310. Bores 376 are oriented on top coupler 362 to receive shear members 332 therein and to secure support member 306 to anchor member 302. In the exemplary embodiment, bores 376 are slotted such that bores 376 have a non circular cross section. Accordingly, bores 376 allow shear members 332 to travel along the bore slot 376, such that top coupler 362 can rotate with respect to bottom coupler 310 to enable indexing or orienting signpost assembly 300 to find the optimum sign position for the traffic pattern without regard to the orientation of anchor member 302 with respect to the traffic pattern. In one embodiment, bores 376 facilitate rotation of top coupler 362 with respect to bottom coupler 310 for up to twelve degrees of rotation. In another embodiment, bores 376 facilitate rotation of top coupler 362 with respect to bottom coupler 310 for more than twelve degrees of rotation.

Base member 364 is substantially similar to coupler sidewall 182, and extends from first surface 370 of top coupler 362. Base member 364 has a generally square cross-section. Alternatively, base member 364 may have a variety of other shapes including, but not limited to, L-shaped, J-shaped, circular, U-channel, or flanged beam cross sections. Moreover, base member 364 is hollow and includes recess 194 defined therein by inner surface 192 of member 364. In the exemplary embodiment, recess 194 has a generally square cross-sectional shape. Alternatively, recess 194 is defined by a variety of other shapes, including, but not limited to, rectangular, circular, or triangular shapes. In one embodiment, top coupler 362 is integrally formed with base member 364. In another embodiment, top coupler 362 may be coupled to base member 364 in a variety of other means, including, but not limited to welding, gluing, or bolting.

Recess 194 has a cross-sectional shape that is generally the same as a cross-sectional shape of a sign support 52 to be inserted therein. More specifically, recess 194 is also defined by a wedge recessed area 202 that, as described in more detail below, facilitates securing sign support 52 within recess 194 without the use of mechanical fastening means. More specifically, recessed area 202 is also at least partially recessed with respect to an upper end face 207 of base member 364. In an alternative embodiment, recess 194 is defined by a plurality of wedge recessed areas 202. In the exemplary embodiment, recessed area 202 tapers gradually from an upper end face 207 towards top coupler first surface 370. For example, in the exemplary embodiment, recessed area 202 tapers inwardly approximately 5° from end face 207 towards first surface 370. In the exemplary embodiment, recess 194 is generally square-shaped and wedge recessed area 202 is configured to contact a corner 208 of sign support 52 when support 52 is coupled within top coupler 362.

Recessed area 202 is sized to receive locking wedge 220 therein. Locking wedge 220 is formed with a pair of sidewalls 222 that are substantially perpendicular to each other, and that each extend from an anchoring head 224. More specifically, each sidewall 222 is formed from a plurality of wedge shaped projections 226 that extend from anchoring head 224 to a lower end 228 of each wedge 220. More specifically, in the exemplary embodiment, wedge shaped projections 226 extend along the outer and inner surfaces 240 and 242, respectively, of each locking wedge 220. Moreover, in the exemplary embodiment, each sidewall 222 tapers gradually from head 224 to lower end 228.

During assembly of breakaway signpost assembly 300, initially ground anchor connector 308 is inserted into the ground such that top edge 380 of ground anchor connector 308 is approximately one inch above grade. Bottom coupler 310 is then positioned against ground anchor connector 308 such that top edge 380 is located within cavity 330 and is substantially concentrically aligned with respect to cavity 330. More specifically, because cavity 330 is countersunk, when bottom coupler 310 is positioned against ground anchor connector 308, in the exemplary embodiment, bottom coupler second surface 322 will be substantially flush with the grade.

Bushing 334 is then positioned adjacent bottom coupler 310 such that second surface 354 of bushing 334 is in contact with first surface 320 of bottom coupler 310. Shear members 332 are then placed within bushing bores 358 such that shoulder stops 344 are resting against first surface 320 of bottom coupler 310. Nuts 333 are then secured to each shear member first end 336. Alternatively, shear members 332 may be coupled to bottom coupler 310 prior to aligning bushing 334 over shear members 332.

Top coupler 362 is then positioned against bushing 334 such that shear member second end 338 extends through top coupler bores 376. Nuts 368 are then rotatably coupled to each shear member second end 338 and are tightened until top coupler 362 and bottom coupler 310 are fully tightened against bushing 334. The slotted bores 376 of top coupler 362 enables indexing or orienting signpost assembly 300 to find the optimum sign position for the traffic pattern without regard to the orientation of anchor member 302 with respect to the traffic pattern.

Furthermore, when top and bottom couplers 362 and 310, respectively, are fully coupled together, bushing 334 is compressed in sealing contact between bottom coupler first surface 320 and top coupler second surface 372. The compression of bushing 334 facilitates preventing moisture from contacting shear member necked-down section 338. Moreover, the compression of bushing 334 also facilitates bushing 334 forcing top coupler 362 away from bottom coupler 310 during an impact. In addition, bushing 334 facilitates spreading the wind bearing load over a greater area than necked-down section 338 to provide greater resistance to wind shear than shear member 332 has alone while still allowing shear member 332 to shear in compliance with FWHA standards.

Sign support 52 is then inserted into base member recess 194 until bottomed out. Locking wedge 220 is then forcibly inserted into recessed area 202. As locking wedge 220 is inserted between sign support 52 and base member 364, wedge shaped projections 226 facilitate securing support member 306 within recess 194 without the use of additional fasteners and/or hardware.

The above-described breakaway signpost assemblies are cost-effective and highly reliable. Each signpost assembly includes a coupling assembly that is coupled together such that the lower portion of the post assembly is securely coupled to an anchor member via a pair of locking wedges. Moreover, the sign support post is coupled to an upper portion of the post assembly using at least one wedge assembly such that no additional mechanical hardware is necessary to secure the sign support to the coupling assembly. As a result, the signpost assembly securely couples a sign to an anchor in a manner that is cost effective, reliable, and satisfies current FHWA yield criteria for structures located adjacent to designated traffic areas.

Exemplary embodiments of breakaway signpost assemblies are described above in detail. The assemblies are not limited to the specific embodiments described herein, but rather, components of each assembly may be utilized independently and separately from other components described herein. For example, each signpost assembly component can also be used in combination with other signpost assembly components or signpost assembly configurations.

While the invention has been described in terms of various specific embodiments, those skilled in the art will recognize that the invention can be practiced with modification within the spirit and scope of the claims.

What is claimed is:

1. A breakaway signpost connector for attaching a sign support member to an anchor member, said connector comprising:
at least one shear member having a first end, a second end, and a necked down section between said first and second ends;
a coupler assembly surrounding said shear member and comprising a first opening and a second opening, said shear member first end extending through said first opening, said shear member second end extending through said second opening;
a bushing surrounding said shear member between said shear member and said coupler assembly, said bushing supports said necked-down section; and
a wedge assembly comprising at least one wedge shaped projection configured to secure said shear member to at least one of said anchor member and to said sign support member.

2. A connector in accordance with claim 1, wherein said shear member further comprises a shoulder extending radially outward from one of said first end and said second end, said shoulder having an outer diameter, said bushing comprises a substantially circular opening extending therethrough, said bushing opening having a diameter substantially equal to said shoulder outer diameter.

3. A connector in accordance with claim 1 wherein said coupler assembly further comprises a recess defined therein, said recess sized to receive at least a portion of said bushing therein.

4. A connector in accordance with claim 1 wherein said shear member comprises a bolt.

5. A connector in accordance with claim 4 wherein said bolt further comprises at least one flat side extending through said necked-down section.

6. A connector in accordance with claim 1 wherein said necked-down section has a maximum diameter approximately equal in diameter to said first end and said second end.

7. A connector in accordance with claim 1 wherein said wedge assembly further comprises a pair of opposed wedge shaped projections, each said wedge shaped projection comprises a channel formed therein and a recessed area, said pair of wedge shaped projections are positioned such that said channels form a passageway sized to receive at least a portion of said shear member therein.

8. A connector in accordance with claim 7 wherein said pair of wedge shaped projections are coupled against each other such that said recessed areas form a cavity sized to contain a first flanged nut therein.

9. A connector in accordance with claim 8 further comprising a second flanged nut coupled to said shear member first end such that said nut is adjacent said necked-down section.

10. A connector in accordance with claim 1 wherein said wedge assembly contains a flanged nut therein sized to rotatably couple to said shear member first end.

11. A connector in accordance with claim 10 wherein said wedge assembly is sized to be inserted within the anchor member, said nut is configured to force said wedge assembly outward when threadably coupled to said shear member.

12. A connector in accordance with claim 1 wherein said coupler assembly includes a recess sized to receive at least a portion of the sign support member therein, said wedge assembly for securing the sign support member within said coupler assembly recess.

13. A breakaway signpost assembly configured to extend from the ground, said breakaway signpost assembly comprising:
  an anchor member configured to be inserted at least partially into the ground, said anchor member defining a recess therein;
  a shear bolt comprising a threaded first end, a second end, and a necked-down section, said necked-down section separating said first end and said second end, one of said first and second ends comprising a shoulder;
  a bushing surrounding said shear bolt and said shoulder such that said bushing extends between said shoulder and said coupler assembly;
  a coupler assembly surrounding said shear bolt and comprising:
    a first opening and a second opening, said shear bolt first end extending through said first opening, said shear bolt second end extending through said second opening; and
    an upper member and a lower member coupled together, said first opening extending through said upper member, said second opening extending through said lower member.

14. An assembly in accordance with claim 13 wherein said upper member comprising a serrated end face, said lower member comprising a serrated end face, said upper and lower members configured to couple together such that said serrated end faces mesh together.

15. An assembly in accordance with claim 14 said serrated end faces facilitate orienting said upper member with respect to said lower member.

16. An assembly in accordance with claim 13 wherein said bushing is compressed between said upper and lower members.

17. An assembly in accordance with claim 13 further comprising a sign support, said sign support coupled to said coupler assembly.

18. An assembly in accordance with claim 17 wherein said coupler assembly further comprises a recess defined therein, said recess sized to receive at least a portion of said sign support therein.

19. An assembly in accordance with claim 18 further comprising a wedge assembly configured to secure said sign support within said coupler assembly recess.

20. An assembly in accordance with claim 19 wherein said wedge assembly comprises a plurality of wedge shaped projections configured to secure said sign support within said coupler assembly recess.

21. An assembly in accordance with claim 18 further comprising a wedge assembly inserted between said sign support and a portion of said coupler assembly, said wedge assembly configured to secure said sign support within said coupler assembly recess.

22. An assembly in accordance with claim 13 further comprising a wedge assembly configured to secure said breakaway signpost assembly to said anchor member.

23. An assembly in accordance with claim 22 wherein said wedge assembly comprises a plurality of wedge shaped projections configured to secure said shear bolt to said anchor member.

24. An assembly in accordance with claim 22 wherein said wedge assembly comprises a pair of opposed wedges, each said wedge comprising a channel formed therein and a recessed area, said pair of wedges are positioned such that said channels form a passageway sized to receive at least a portion of said shear bolt therein.

25. An assembly in accordance with claim 24 wherein said passageway is tapered.

26. An assembly in accordance with claim 24 wherein said pair of wedges are coupled against each other such that said recessed areas form a cavity sized to contain a first flanged nut therein.

27. An assembly in accordance with claim 26 further comprising a second flanged nut coupled to said shear bolt first end such that said nut is adjacent said necked-down section.

28. An assembly in accordance with claim 24 wherein said wedge assembly contains a first flanged nut therein, said first flanged nut is sized to rotatably couple to said shear bolt first end.

29. An assembly in accordance in accordance with claim 28 wherein said wedge assembly is sized to be inserted within said anchor member, said first flanged nut is configured to force said wedge assembly outward when threadably coupled to said shear bolt.

30. An assembly in accordance with claim 13 further comprising first and second flanged nuts, said first flanged nut coupling said shear bolt to said coupler assembly, said second flanged nut coupled to said shear member first end adjacent said necked-down section.

* * * * *